UNITED STATES PATENT OFFICE.

TRAUGOTT SANDMEYER, OF BASLE, SWITZERLAND, ASSIGNOR TO JOHN R. GEIGY & CO., OF SAME PLACE.

PROCESS OF PRODUCING INDIGO.

SPECIFICATION forming part of Letters Patent No. 647,280, dated April 10, 1900.

Application filed December 7, 1899. Serial No. 739,507. (No specimens.)

*To all whom it may concern:*

Be it known that I, TRAUGOTT SANDMEYER, a citizen of the Swiss Confederation, residing at Basle, Switzerland, have invented certain new and useful Improvements in Processes of Making Indigo, Pure and Mixed with Indigo-Red, of which the following is a specification.

Ad. von Baeyer has proved in his fundamental works on indigo that certain derivatives of isatin—as, for instance, isatin chlorid, the pseudoisatin-alpha-oxim, and the ethers of isatin—by moderate reduction can be transformed, particularly with ammonium sulfid, into indigo, with which, however, always more or less indigo-red is formed, (*Berichte der Deutschen Chemischen Gesellschaft*, Vol. XI, p. 1217; XII, 456; XVI, 2203.)

In my application, Serial No. 739,508, filed December 7, 1899, I have described the production of a new derivative of isatin—namely, alpha-isatin-anilid—of the formula:

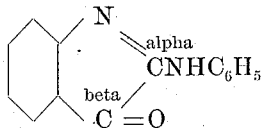

or in the tautomeric pseudoform

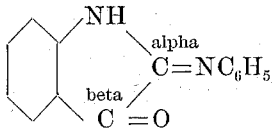

The present invention (for which patents have been applied for in Germany, G 13,634, dated July 15, 1899; in England, No. 15,497/99, dated July 28, 1899; in France, No. 279,418, dated August 2, 1899; in Belgium, dated August 1, 1899; in Russia, dated August 1, 1899; in Italy, dated August 1, 1899; in Spain, No. 24,756, granted October 11, 1899; in Austria, dated August 1, 1899, and in Hungary, No. 13,536, dated August 1, 1899) is based upon the discovery that this alpha-isatin-anilid may be added to the above-named isatin derivatives, but in practical working with the very important difference that the formation of indigo from the pure substance takes place very easily and nearly without any admixture of indigo-red. However, such an admixture of indigo-red can be brought about in every desirable proportion if the reduction of the alpha-isatin-anilid is carried out in the presence of certain quantities of isatin. The ammonium sulfid which Ad. von Baeyer has employed with success has also proved to be in this case the most suitable reducing agent.

The following examples will serve to illustrate the manner in which the invention can be carried into practical effect. The parts are by weight:

*Example I—Production of indigo.*—To a warm solution of twenty parts of alpha-isatin-anilid in sixty parts of alcohol are quickly added, with stirring, forty parts of a freshly-prepared solution of ammonium sulfid containing ten per cent. of sulfureted hydrogen. By the chemical heat of the reaction the solution turns in color to green and then to blue, and the immediate separation of indigo in small crystals takes place. Finally, the mixture is boiled for a short time, and then the indigo is filtered off, washed with hot alcohol, and dried. The sulfur it contains can be removed by treatment with carbon disulfid.

*Example II—Production of determinate mixtures of indigo and indigo-red.*—To a warm solution of five parts of isatin and fifteen parts of alpha-isatin-anilid in sixty parts of alcohol are quickly added, with stirring, forty parts of the above (example I) mentioned solution of ammonium sulfid. The separation of the mixture of indigo with indigo-red takes place in the same way, and the further treatment is the same as that above described, Example I. In appearance the product differs little from the foregoing one. Both are dark crystalline powders showing a slight copper-colored luster; but their dyeings, also the solution of their sulfonic acids, show a surprising difference in the shades, which, according to the employed quantity of isatin, vary from the greenish blue of pure indigo carmine to reddish violet.

In these examples the alcohol may be substituted by water, benzol, &c.

What I claim as new, and desire to secure by Letters Patent, is—

The herein-described process of producing indigo pure and mixed with indigo-red, which consists in forming a suitable solution of alpha-isatin-anilid of the formula:

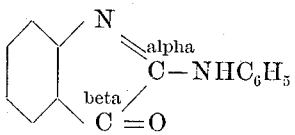

or in the tautomeric pseudoform

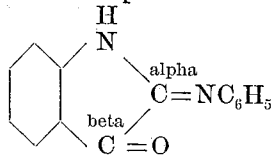

and reducing the same by means of ammonium sulfid, substantially as set forth.

In testimony that I claim the foregoing as my invention I have signed my name in presence of two subscribing witnesses.

TRAUGOTT SANDMEYER.

Witnesses:
GEORGE GIFFORD,
ALBERT GRAETER.